July 17, 1928.
A. H. LINDE
1,677,833
LAMINATED CAGE FOR ANTIFRICTION BEARINGS AND ART
OF MANUFACTURING SUCH CAGES
Filed Feb. 18, 1927
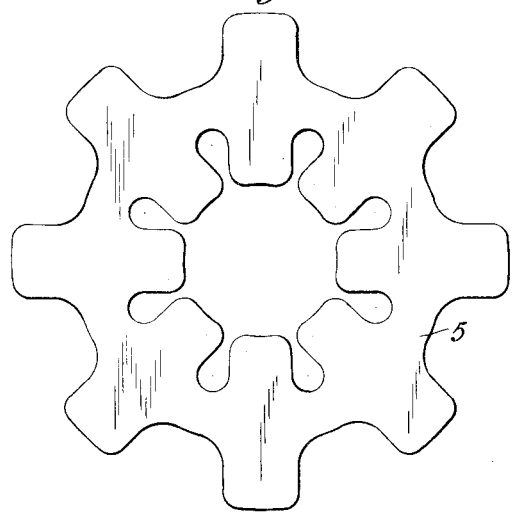
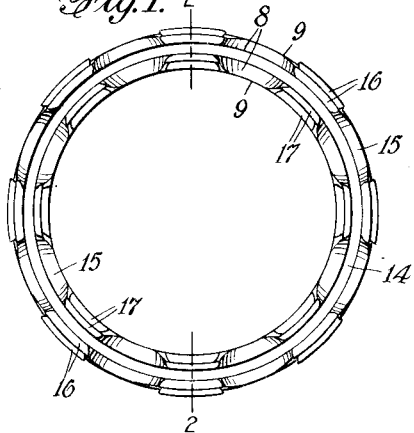
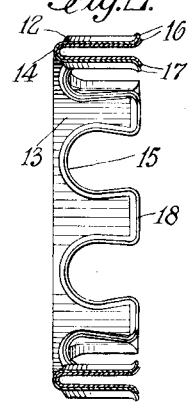
INVENTOR
Andrew H. Linde
BY
ATTORNEY Patented July 17, 1928.

1,677,833

UNITED STATES PATENT OFFICE.

ANDREW H. LINDE, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

LAMINATED CAGE FOR ANTIFRICTION BEARINGS AND ART OF MANUFACTURING SUCH CAGES.

Application filed February 18, 1927. Serial No. 169,160.

This invention relates to cages for separating and retaining the rolling elements of anti-friction bearings, and has for an object to provide a laminated permanently united structure for this purpose which is preferably formed from a plurality of super-imposed blanks as one piece in suitable forming dies.

In the accompanying drawings a cage made in accordance with the invention is illustrated as is also the blank used in the method of formation, in which drawings Figure 1 is an elevation of my improved cage.

Fig. 2 is a section taken at about the plane of the lines 2—2 of Figure 1.

Fig. 3 is a face view of a blank which is capable of formation in the illustrated cage, and Fig. 4 is a central cross section of two blanks super-imposed for the action of the forming dies, not illustrated.

Heretofore I have made cages for ball bearings of a single piece of metal of about the combined thicknesses of the super-imposed metal illustrated herein, the cages being very similar in shape to the illustration in Figures 1 and 2. In certain applications it has been found that more flexibility in certain parts of the structure would be desirable. To afford this flexibility in those cases where it is needed, I have proposed building the blank which is to be acted upon by the forming dies of a plurality of super-imposed sheets each considerably thinner than the blanks which I have heretofore used. For the purpose of illustrating the invention and to simplify the description, a blank 5 is represented in Figs. 3 and 4 which is built up of two similarly formed super-imposed members 6 and 7, each of these being of a thickness equal to about one-half the thickness of the previously used single or one piece blank. Also for the purpose of description it will be assumed that the blank 6 is the one which will form the member 8—8 of the cage, see Figure 1, and the sheet 7 of the blank will form the member 9—9 of the completed cage.

The form of cage selected for illustration is that which is intended for use upon the deep groove annular bearing of the Conrad type and preferably of the two row variety, the application of a single piece cage to a two row bearing being illustrated in my application, Serial No. 82,568 filed January 20th, 1926 and renewed December 4th, 1926 which is now pending but allowed.

The forming dies will act upon the plurality of these super-imposed blanks as one piece, thereby forming these blanks and permanently uniting them into a single cage.

In the illustration the separator is shown drawn from the built up or laminated piece of sheet metal hereinabove mentioned and forms two substantially cylindrical plates 12 and 13 united at one end by a fold 14. This fold 14 is really the bottom or connecting member made by the drawing dies. During the drawing operation a series of notches for affording ball pockets 15 are formed in the free edges of the plates. The metal of each of the blank members 6 and 7 during the operation of forming these pockets is extruded in a flange directed away from the respective plates. When these plates are formed quite close together, as they are shown in Figures 1 and 2, the extruded metal is directed toward the outer faces of the plates. Or in other words, the flanges 16 from the laminae of the outer plate are directed outwardly and the flanges 17 from the laminae of the inner plate are directed inwardly. In the illustration the flange of the lamina of each plate is shown extending entirely around each ball pocket 15 and continuing between pockets, see 18 Fig. 2.

The curvature of the inner faces of the pocket forming flanges 16 and 17 is such that they extend above and below the great circle of the ball so that the cage will not permit a ball to either unduly depress or raise the cage, that is, the ball cannot ride over or under the cage.

It will be apparent that the number of layers of which the blank is built up may be varied according to different requirements and that the ultimate shape of the cage herein shown and described is illustrative of the invention, and that other forms may be made for other types of bearings.

Having described my invention I claim and desire to secure by Letters Patent:

1. A spacing cage for anti-friction bearings consisting of a body portion formed of super-imposed permanently united layers and folded, presenting two plates disposed face to face and provided at intervals in their edges with open notches, and having flanges extending outwardly from the layers at the notches laterally beyond the faces of the plates and constituting conjointly ball holding sockets.

2. A spacing cage for anti-friction bearings consisting of a body portion formed of super-imposed permanently united layers and folded, presenting two plates disposed face to face and provided at intervals in their edges with open notches, and having flanges extending outwardly from the layers at the notches laterally beyond the faces of the plates and constituting conjointly ball holding sockets, the flanges being continued and extending along the edges of the plates between sockets.

3. A spacing cage for anti-friction bearings consisting of a body portion formed of super-imposed permanently united layers and folded, presenting two plates disposed face to face and provided at intervals in their edges with open notches, and having flanges extending outwardly from the layers at the notches laterally beyond the faces of the plates and constituting conjointly ball holding sockets, the flanges from all the layers being continued and extending along the edges of the plates between sockets.

4. That improvement in the art of forming anti-friction bearing rings which consists in first blanking out sheet metal, then super-imposing a plurality of these blanks between forming dies, and then subjecting such super-imposed blanks as one piece to the formative action of the dies, thereby producing a single cage.

5. That improvement in the art of forming anti-friction bearing cages which consists in first blanking out sheet metal, then super-imposing a plurality of these blanks between forming dies, and then subjecting such super-imposed blanks as one piece to the formative action of the dies, and thereby forming the blanks and permanently uniting them in a single cage.

Signed at Philadelphia, Pennsylvania, this fifteenth day of February, 1927.

ANDREW H. LINDE.